J. YOCOM.
VARIABLE SPEED GEAR.
APPLICATION FILED FEB. 24, 1913.
1,078,398.
Patented Nov. 11, 1913.
2 SHEETS—SHEET 1.
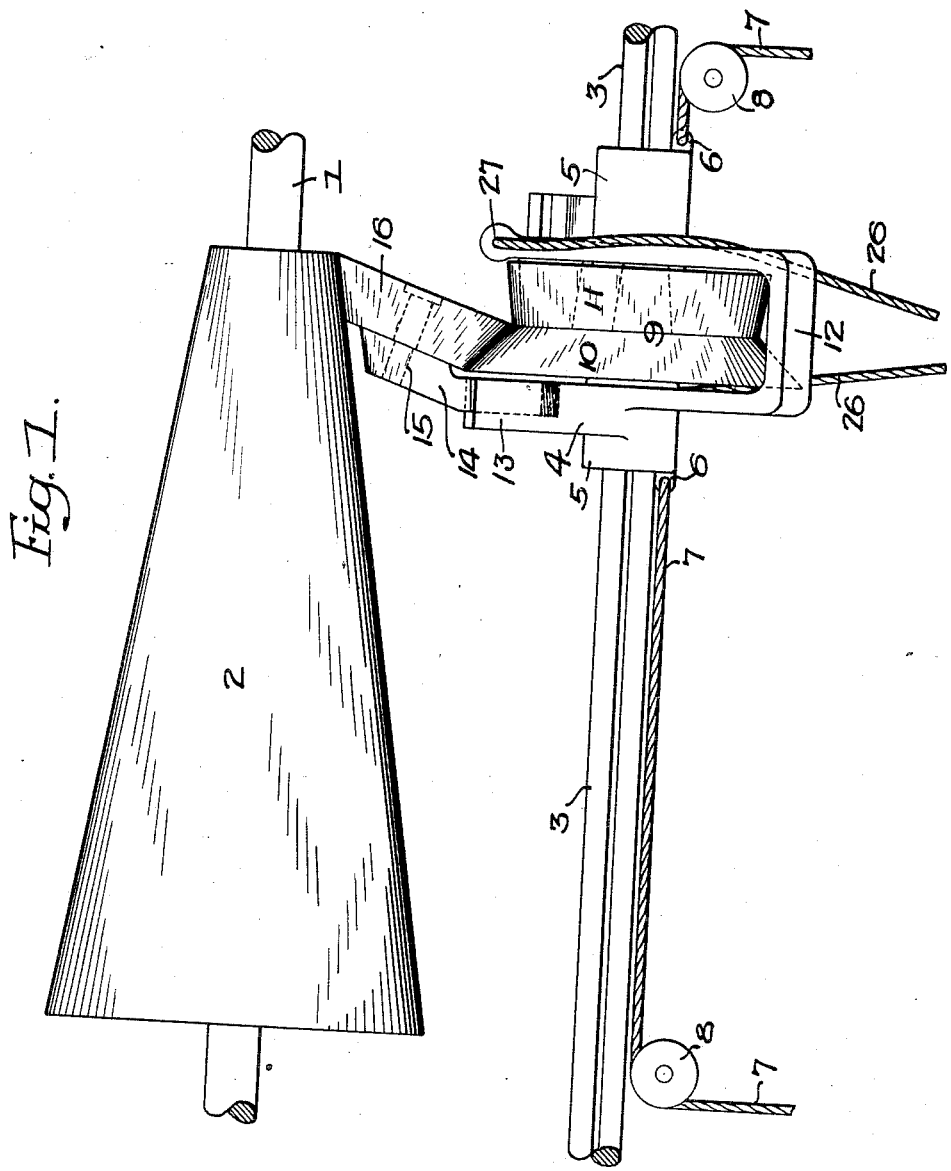

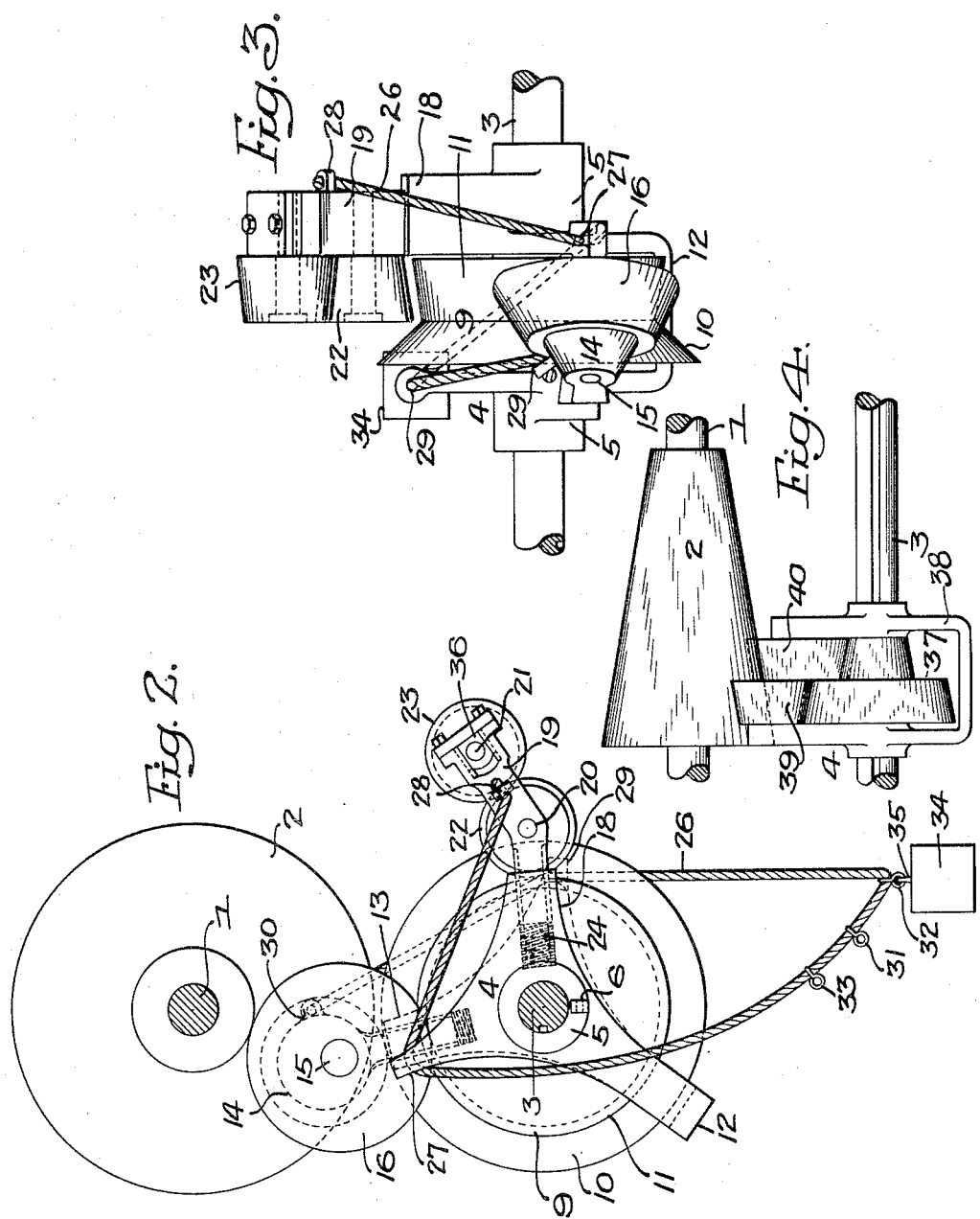

UNITED STATES PATENT OFFICE.

JAMES YOCOM, OF PHILADELPHIA, PENNSYLVANIA.

VARIABLE-SPEED GEAR.

1,078,398.  Specification of Letters Patent.  Patented Nov. 11, 1913.

Application filed February 24, 1913. Serial No. 750,360.

*To all whom it may concern:*

Be it known that I, JAMES YOCOM, a citizen of the United States, residing in Philadelphia, Pennsylvania, have invented certain Improvements in Variable-Speed Gear, of which the following is a specification.

One object of my invention is to construct a variable speed gear which will be simple in construction and in which the parts will have an extended contact.

A further object is to so construct the mechanism that the reverse cone and the forward driving cone will contact with the main or primary cone at the same point, so that, when the mechanism is reversed, it is not necessary to shift it longitudinally on the shaft.

The invention relates particularly to a variable speed and reverse gear using one elongated cone and a splined shaft on which a carrier is mounted which supports the driven mechanism.

In the accompanying drawings:—Figure 1, is a side view of my improved variable speed and reverse mechanism; Fig. 2, is an end view; Fig. 3, is a plan view of the driven element; and Fig. 4, is a view illustrating a modification of the invention.

Referring to the drawings, 1 is the driving shaft having an elongated cone 2 thereon.

3 is a driven shaft having a keyway throughout its length, in the present instance.

4 is a carrier having bearings 5 mounted on the shaft 3. On each end of the carrier is an eye 6 to which is attached a cord 7 passing around a roller 8 at each end of the mechanism, so that, by pulling either cord, the carrier can be traversed longitudinally on the shaft 3. Mounted on the shaft 3 between the two bearings is a double faced wheel 9, having two conical faces 10 and 11. This wheel has a key adapted to the keyway in the shaft 3, so that the shaft will turn with it.

As illustrated in Fig. 2, the carrier has three arms. One arm 12 connects the two bearings 5, and the arm 13 has a radial undercut slot and is arranged to receive the bracket 14 carrying a stud 15 on which is a conical wheel 16. This conical wheel bears against the cone 2 and also against the conical face 10 of the wheel 9. A spring is mounted under the bracket 14 within the slot in the arm 13 and tends to force the bracket out and insures the conical wheel properly bearing against the cone 2.

On the arm 18 of the carrier 4 is a sliding bracket 19 adapted to an undercut slot in the arm, and projecting from this bracket are two studs 20 and 21 on which are mounted the two friction wheels 22 and 23, respectively. The wheel 23 bears against the cone 2 and is in frictional contact with the wheel 22 which, in turn, bears against the conical face 11 of the wheel 9. Back of the bracket 19 is a spring 24 tending to force the bracket 19 out, so as to insure the proper contact of the wheel 23 with the cone 2. In the present instance the stud 21 is carried by a block 36 which is arranged to slide in the bracket 19, so that the wheel 23 is free to adjust itself to the cone 2 and wheel 22.

The carrier 4 can swing on the shaft 3 so as to bring either the wheel 16 or the wheel 23 in contact with the cone 2. When the wheel 16 is in contact with the cone, as illustrated in Fig. 1, then the shaft 3 is driven forward and when the cone wheel 23 is shifted into contact with the cone 2, then the rotation of the shaft 3 is reversed. In order to shift the carrier I use a rope 26. One end of this rope is passed through the eye 27 on an arm of the carrier and is attached to the bracket 19 at 28, while the other end of the rope passes through the eye 29 in an arm of the carrier and is attached to the bearing 14 at 30. At the loop of the rope are three eyes 31, 32 and 33.

34 is a weight having a hook 35, which can be attached in any one of the eyes 31, 32 or 33. When the weight is hooked into the eye 31, for instance, the carrier is shifted into the mid-position and is held so that both friction wheels 16 and 23 are clear of the cone 2 and no motion is imparted to the shaft 3. When the weight is hooked into the eye 32, as illustrated in Fig. 2, then the carrier is shifted and is held in position by the weight with the conical wheel 16 bearing against the cone 2 and the shaft 3 will be driven forward in one direction through the mechanism. When the weight is hooked into the eye 33, then the carrier is shifted and is held in position with the wheel 23 bearing against the cone 2. This will reverse the direction of movement of the shaft 3 and motion is imparted through it from the cone 2 to the wheels 23 and 22, and the cone face 11 of the wheel 9 which is splined to the shaft.

Thus it will be seen that I am enabled to construct a very simple device which, when the mechanism is shifted longitudinally, will change the speed of the shaft 3 and the direction of rotation of the shaft can be readily changed by locating the carrier on the shaft, as described above, or the shaft 3 can be thrown out of gear with the shaft 1 by moving the carrier to the central position.

By arranging the wheel in the manner shown in the drawings, I can reverse the mechanism without changing the speed of the driven element, as, when the carrier is shifted, the wheel 23 will bear upon the cone at the same point as the wheel 16. This is of great advantage where it is desired to change the direction of movement of the shaft without changing the speed.

I have not shown the bearings for the shafts 1 and 3, as any suitable bearings may be used, depending upon the location of the change speed gear.

In Fig. 4, I have illustrated a modification, in which the mechanism is shifted not to reverse the movement of the driven shaft but to vary the speed to a greater extent than with the mechanism shown in Fig. 1, and thus a comparatively short cone can be used. 1 is the driving shaft having a cone 2 of any length desired, 3 is the driven shaft, 37 is a double faced wheel splined to the shaft, 38 is a carrier for shifting the wheel 37 and which also carries the wheels 39 and 40 located on either side of the cone 2. The wheels 39 and 40 are of different diameters, as are also the faces of the wheel 37. When the wheel 39 is in contact with the cone the shaft 3 is driven at a slow speed. When the wheel 40 is in contact with the cone then the shaft 3 is driven at a higher speed.

In some instances the shaft 3 may be the driving shaft and the shaft 1 the driven shaft, and one set of wheels may be dispensed with when it is desired to simply shift the carrier on the shaft and to move the wheel into and out of contact with the cone.

I claim:—

1. The combination of a driving shaft; a cone thereon; a driven shaft having a keyway therein; a cone wheel mounted on the last mentioned shaft and having a key adapted to the keyway in the driven shaft; a carrier mounted on the shaft; a bracket on the carrier; and a cone wheel on the bracket bearing against the cone wheel splined to the driven shaft and arranged to bear against the cone on the driving shaft.

2. The combination of a driving shaft; a cone thereon; a driven shaft; a conical wheel so mounted on the shaft that it will turn therewith and slide thereon; a carrier for shifting the wheel on the shaft; a bracket yieldingly mounted on the carrier and having a stud; and a cone wheel mounted on the stud and bearing against the cone wheel on the driven shaft and arranged to bear against the cone on the driving shaft.

3. The combination in a change speed reverse gear, of a shaft having a cone thereon; a second shaft; a double faced cone wheel splined thereto; a carrier mounted on said last mentioned shaft for shifting the double faced cone wheel longitudinally thereon; two brackets on the carrier; a conical wheel mounted on one bracket and bearing against one of the faces of the double faced cone wheel and arranged to bear against the driving cone, the other bracket having two wheels, one bearing against the other and one of said wheels bearing against the other face of the double cone wheel and the other wheel arranged to bear against the cone on the first mentioned shaft.

4. The combination of a driving shaft; a cone thereon; a driven shaft; a double faced wheel mounted on the driven shaft so as to slide thereon but turn therewith; a carrier mounted on the shaft and arranged to shift the said wheel longitudinally thereon; a bracket yieldingly mounted on the carrier; a wheel mounted on the bracket and bearing against one face of the wheel on the driven shaft and arranged to bear against the cone; a second bracket yieldingly mounted on the carrier and having two wheels thereon, said wheels being in contact, one of said wheels bearing against the other face of the wheel on the driven shaft, the other wheel being arranged to bear against the cone when the carrier is shifted.

5. The combination of a driving shaft; a cone thereon; a driven shaft; a double faced conical wheel mounted thereon, the faces being at different angles; a carrier arranged to slide on the shaft and extending on each side of the double faced wheel; two undercut guideways in the carrier; bearings shaped to fit the undercut ways; a spring back of each bearing tending to force the bearing out from the shaft; a single beveled friction wheel on one bearing arranged to bear directly against the cone and one face of the double faced wheel; two conical friction wheels carried by the other bearing, one of said wheels bearing directly against the other face of the double faced wheel carried by the bearing, said latter wheel bearing directly against the cone; and means for rocking the carrier so as to bring either one or the other set of wheels into the driving position.

6. The combination of a driving shaft; a cone thereon; a driven shaft; a double faced wheel arranged to turn with but slide on the shaft; a carrier arranged to slide on the shaft and extending on each side of the double faced wheel; two bearings on the shaft; wheels mounted on the bearings and arranged to be shifted into position with the cone; a cord attached to each bearing and passing through eyes in the carrier; and a weight suspended from said cord, so that when the weight is in one position it will tend to hold one of the wheels in contact with the cone, and when in another position it will hold the other wheel in contact with the cone, and when in the mid-position it will hold the wheels clear of the cone.

7. The combination of a driving-shaft; a cone thereon; a driven shaft having a double faced wheel and arranged to turn therewith but slide thereon; a carrier arranged to slide on the driven shaft; two bearings slidably mounted on the carrier; a single friction wheel mounted in one bearing; two friction wheels mounted on the other bearing and arranged to contact with the double faced wheel on the driven shaft and the cone on the driving shaft; a cord, having three eyes, attached to each bearing, the carrier having eyes through which the cord passes; a hooked weight adapted to be hung from any one of said eyes so as to hold either of the wheels carried by it; and bearings in contact with the cone to hold the wheels out of position and free of the cone.

8. The combination of an elongated cone; a shaft on which the cone is mounted; a second shaft; a wheel having a conical face and mounted to slide on but turn with said shaft; a carrier; and a cone wheel on the carrier and arranged to impart motion from the elongated cone to the wheel having a conical face or vice versa.

In testimony whereof, I have signed my name to this specification, in the presence of two subscribing witnesses.

JAMES YOCOM.

Witnesses:
Wm. E. Shupe,
Wm. A. Barr.

---

Copies of this patent may be obtained for five cents each, by addressing the "Commissioner of Patents, Washington, D. C."